Patented Nov. 13, 1923.

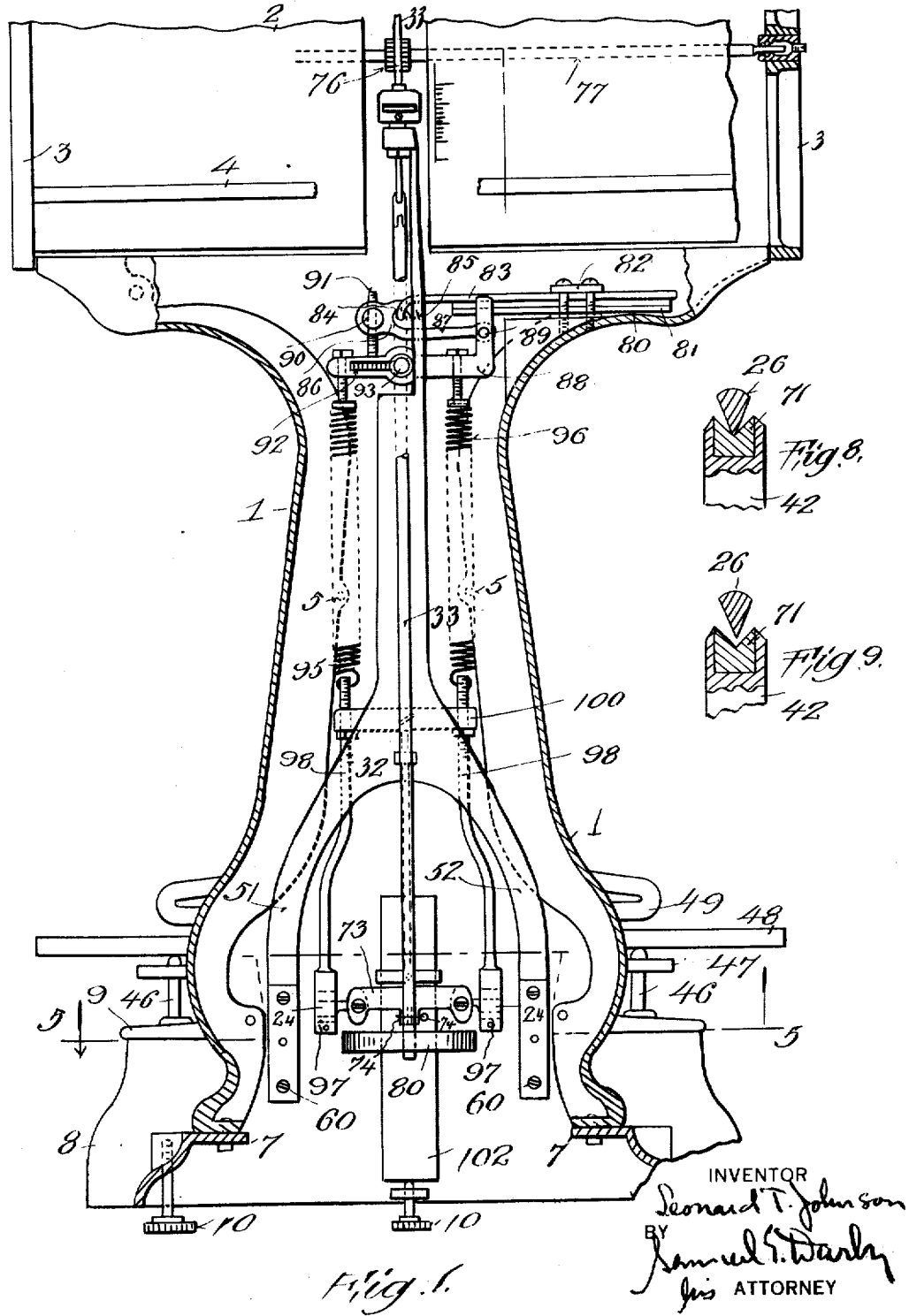

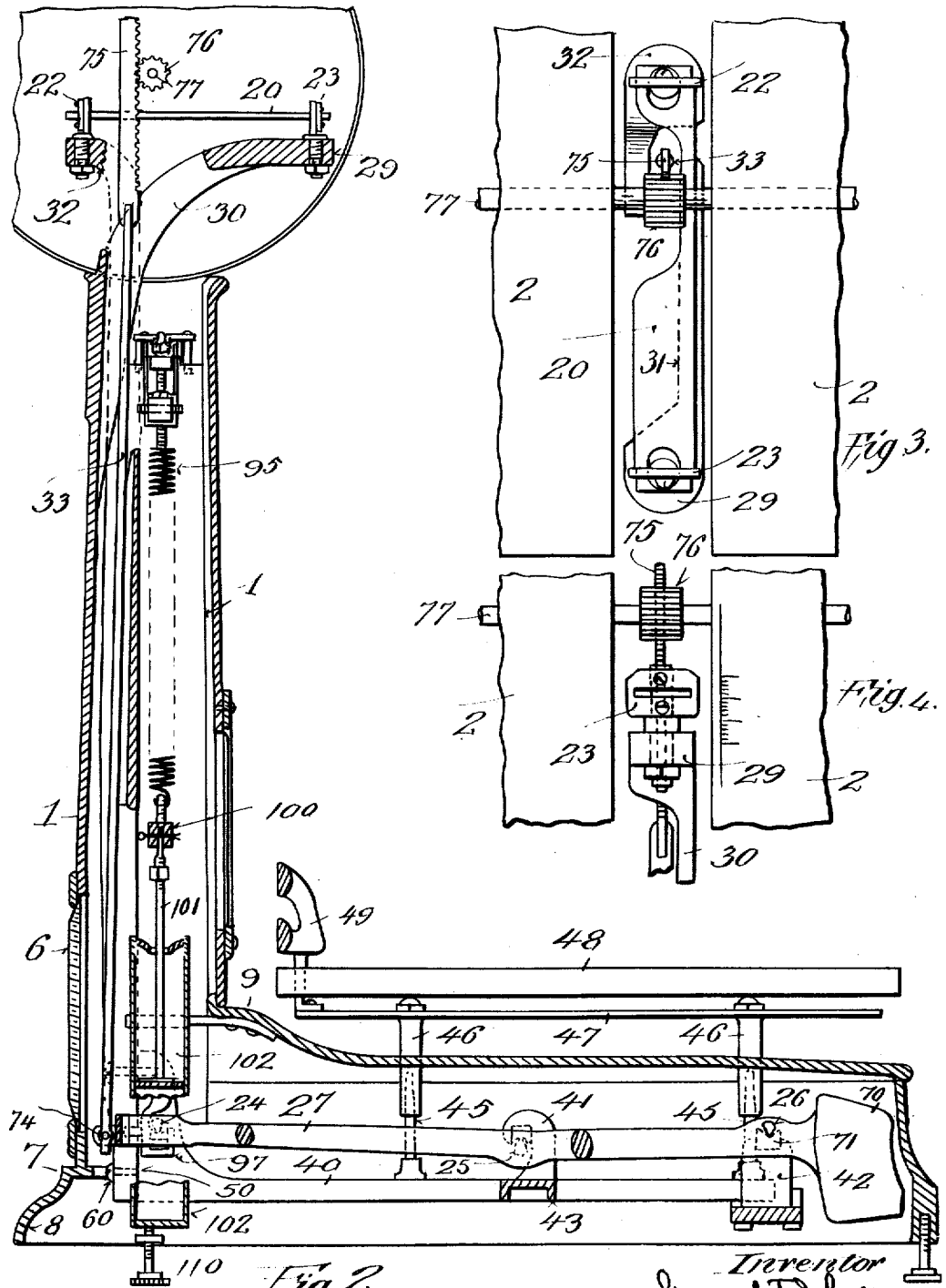

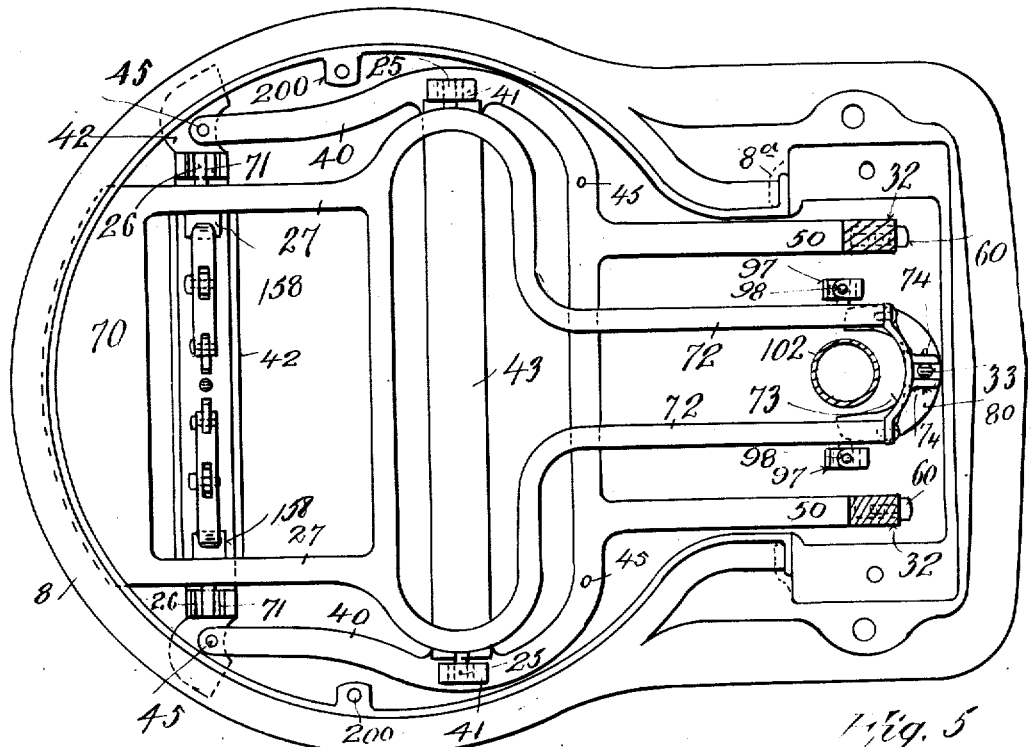
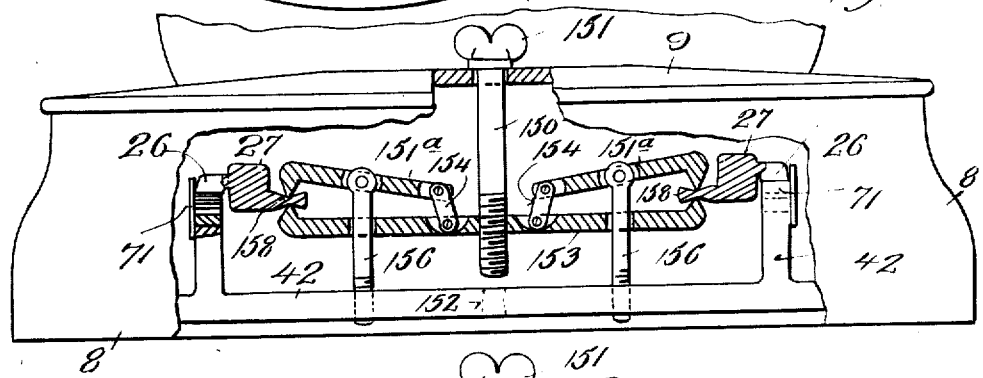
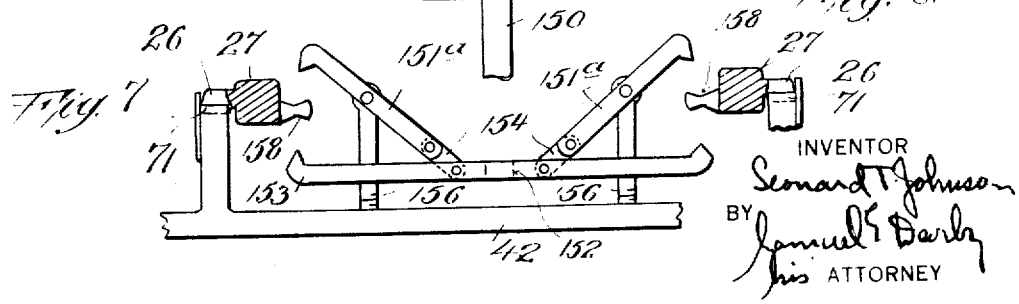

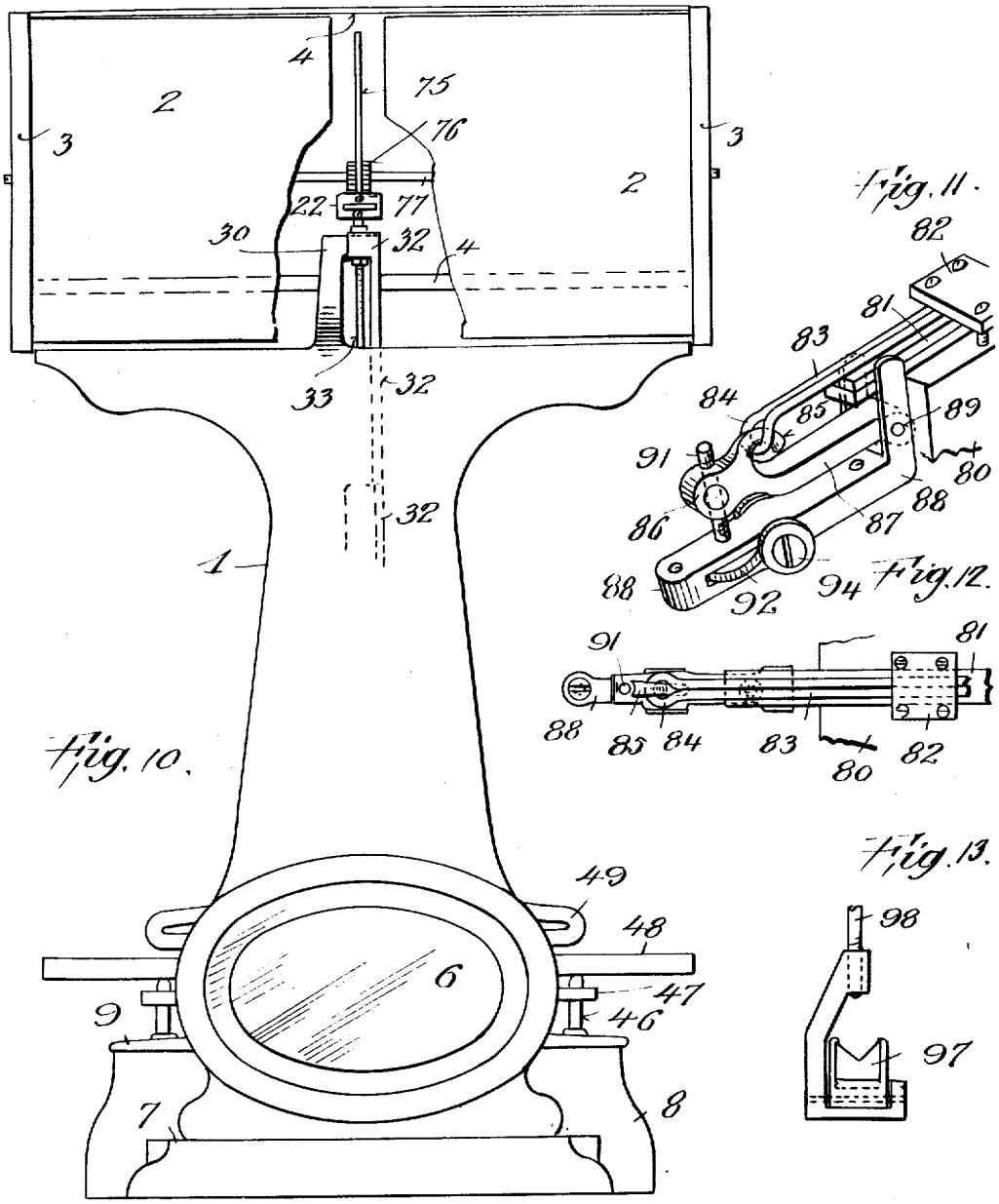

1,474,039

UNITED STATES PATENT OFFICE.

LEONARD T. JOHNSON, OF BOSTON, MASSACHUSETTS.

WEIGHING MECHANISM.

Application filed December 23, 1919. Serial No. 346,983.

*To all whom it may concern:*

Be it known that I, LEONARD T. JOHNSON, a citizen of the United States, residing at Boston, county of Suffolk, State of Massachusetts, have made a certain new and useful Invention in Weighing Mechanism, of which the following is a specification.

This invention relates to weighing mechanisms.

The object of the invention is to provide a weighing mechanism, which is simple in structure, efficient in operation, and economical of manufacture.

A further object of the invention is to provide a weighing mechanism or scale, which due to its simplicity of construction, affords marked advantages over devices of like nature, particularly in that the working parts of the mechanism are rendered more accessible, are simplified in construction, and are more reliable in operation.

A further object of the invention is to provide in a device of this nature means for locking the moving parts thereof during shipment to prevent injury thereto, due to jar, shock, or the like, and to afford a structure capable of ready assembly and adjustment without requiring an expert mechanic or exceptional skill.

A further object of the invention is to provide a weighing mechanism with means for automatically compensating the scale members for inaccuracies due to thermal contraction or expansion caused by changes in temperature.

A further object of the invention is to combine all the operating parts of the lever mechanism in one assembly.

Further objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the drawings:—

Fig. 1 is a view in rear elevation of a weighing device or scale embodying my invention with the back casing shown in section.

Fig. 2 is a sectional view in side elevation of the same.

Fig. 3 is a top plan view of the check rod and actuating arm assembly.

Fig. 4 is a view in front elevation of the same.

Fig. 5 is a sectional view taken on the line 5, 5, Fig. 1, looking in the direction of the arrows.

Fig. 6 is a front view of the base member illustrated in Fig. 5 with a part of the casing broken away to show the lever in its locked position for transportation.

Fig. 7 is a similar view of the lock mechanism alone in its inoperative position with relation to the lever and its supports.

Fig. 8 is a diagrammatic view showing the relation of the operating lever and its support in the position shown in Fig. 7.

Fig. 9 is a similar view showing the relation of these parts in the position shown in Fig. 6.

Fig. 10 is a rear view of the scale structure with the casing for the graduated cylinder removed.

Fig. 11 is a view in perspective of the thermostatic compensation device employed in accordance with my invention.

Fig. 12 is a top plan view of the same.

Fig. 13 is a detail view showing the agate support structure for the knife edge bearing of the platform lever employed in accordance with my invention.

The same part is designated by the same reference numeral wherever it appears throughout the several views.

It is among the special purposes of my present invention to provide a weighing mechanism or scale wherein the moving parts are assembled in one structure, and to provide means to enable all of the moving parts to be locked against movement during transportation, and to enable the actuating parts in the single structure to be removed from the scale. I have shown, and will now describe, a specific embodiment of my invention as applied to a scale of the lever type, but I wish it to be understood that my invention in its broad scope is not to be limited or restricted to the particular details of construction which will be specifically described hereinafter to afford a complete understanding of the principles of my invention contained therein. I provide the usual casing 1 to enclose the vertically extending members of the scale structure to actuate the graduated cylinder 2 suitably journaled for rotative movement in the ends 3 forming part of and supported by the casing 1 in the usual manner. The cylinder 2 is formed in two parts, that is, the same is formed with a right hand and left hand portion with a space between the portions to permit, in the usual manner, the rotation of the cylinder by and in accordance with the weight placed on the scale. The two portions of the cylinder 2 are joined together by suitable tie rods 4 connected at their respective outside ends, and a casing, not shown, provided with the usual window to permit the readings, is employed, which casing is likewise supported by the vertically extending casing 1. The front of the vertical casing 1 is provided with a removable plate adapted to be suitably secured to the casing 1 by means of screws passing through the lugs 5 of the casing, the removable front plate being provided to permit the movable parts contained in the vertical portion of the scale to be removed. The rear of the vertical casing 1 may be provided with a door 6 in the usual well known manner to permit access to the rear of the scale when required. The rear of the casing 1 is supported upon lugs 7 formed on a base casing 8, and cover A, fastened to the front of the casing 1 is supported on the top or cover portion 9 of the base 8. The base is open at its bottom, and is provided with any desired number of adjustable legs 10 to afford seating facilities and to insure proper leveling of the scale. Referring now to Fig. 2 the usual check rod is indicated by reference numeral 20, but it will be noted that in the scale of my invention the check rod is located at the head of the scale, and its bearings 22 and 23 are exactly the same distance apart as the distance between the lever pivots 25 and 26, and the check rod 20 lies in a plane parallel to the plane of the pivot points 25 and 26 of the lever 27. It is well recognized in the scale art that the nearer the check rod is to lying in the same vertical plane as the pivots 25 and 26, i. e., either directly over or under the same, the more efficient and accurate is the structure. With the arrangement of the check rod employed in accordance with my invention, I am enabled to place the check rod nearer to the vertical plane of the pivots than has heretofore been possible in scale mechanism of this nature. It is also recognized that the greater the length of the check rod posts the less friction is imposed to the moving part of the scale, and consequently more accurate results are secured. It will be observed that by placing the check rod in the head as illustrated in the scale of my invention that I am enabled to employ a check rod post of substantially the entire height of the scale, and it is due to this longer post which decreases the friction that I am enabled to offset the check rod itself, which in turn increases the accuracy and simplifies the construction. The nose 29, to which the check rod is anchored, is a curved arm or post, forming part of the back or housing of the casing 1, and this arm or post 30 extends up between the half portions of the cylinders as illustrated in Figs. 3 and 4. This arm 30 is made flat as at 31, i.e., provided with a cut away portion to permit the upright 32 to pass by the same. The upright 32 is similarly made flat or provided with a cut away portion as at 32 to allow the rack 33 to pass between the upright 32ª and the arm 30, and consequently in the space between the two cylinder portions 2 as hereinbefore described.

I provide an underslung platter rest 40 located in the base 8 in the form of a yoke. Intermediate the ends of the arms of the yoke or platter rest 40 I provide upward extending fingers 41 located at the ends of a brace rod 43 for the platter rest 40. The upwardly extending fingers 41 are in the nature of hooks, which hook over the pivots 25 carried by lever 27. Four upwardly extending arms 45 are supported by the platter rest 40, which fit into downwardly extending posts 46 hollowed out to receive the arms, which posts form part of the platter frame 47 and depend downwardly therefrom. The platform of the scale illustrated at 48, which may be of any suitable or desired material, for example, glass, rests on the platter frame 47, and the platter frame, if desired, may be provided with any suitable frame work or containing rail illustrated at 49 artistically shaped to lend artistic appearance to the scale. The platter rest 40 is secured at its ends 50 to the check rod upright 32, which is similarly formed at its lower end in the form of a yoke having arms 51, 52, to which is secured the arms of the platter rest 40, as will be readily apparent, in any suitable manner, for example, by means of screws 60. The lever 27 which is weighted at its front end in the usual manner by means of the weight 70, carries the pivot points 25 and 26, the pivot 26 resting in the agate 71 and the pivot 25 resting in the agate supported by the hook finger 41 of the platter rest 40. The lever 27 is similarly formed in the form of a yoke having arms 72, to the ends of which is secured the member 73, which carries guiding arms 74, between which arms and secured thereto in any suitable manner is the actuating rod 33. The actuating rod is provided at its top end with a rack 75, the teeth of which mesh with the gear 76 mounted on the shaft 77 journaled in the end casings 3, which shaft is the shaft of the cylindrical portions 2 on which the graduations appear. The lower end of the actuating rod 33 is provided with a weight 80 which is offset relative to the axis of the rod, and which in consequence tends to throw the upper end of the rod 33 forwardly, thereby maintaining and insuring constant contact between the rack portion 75 thereof and the gear 76. With the arrangement thus described with the underslung platter rest I am enabled to remove the cover 9 to which the dash pot is fastened, by removing two screws 200 and lift out the lever 27 merely by unhooking the hook finger 41 from the pivots 25 disconnecting rock rod 33 from 74, and this I am enabled to do, it will be apparent, without disassembling many parts of the scale as is required at the present time in the scales heretofore employed.

In accordance with my invention I secure the thermostatic compensation in the parts employed for securing adjustments due to possible wear or at the initial installation of the machine. In accordance with my invention I suitably mount on the inner curved portion 80 of the vertical casing 1 a thermostat formed of a bar 81 made in two pieces of metals having different coefficients of expansion with the top piece containing the metal which is less susceptible to heat and cold than the bottom piece. The metal is fastened to the casing 1 in any suitable manner, for example, by means of screws 82, which also securely clamp an elongated spring member 83 to the metals at a point intermediate its ends. The spring member 83 is preferably of a steel wire bent at one end to form a loop 84, which loop is bent or offset to engage a hook 85 forming part of a bell crank member 86, which member 86 has an extended part 87 which is secured to an arm 88 by means of a pin 89. A nut 90 carried by the member 86 is provided with a threaded bore therethrough, into which is threaded bolt 91, provided at its lower end with a gear wheel 92, which is turned by means of a worm 93 carried by a screw 94, the screw being turned by means of a screw driver, as will be readily understood. Springs 95 and 96 are suspended from the ends of the bar 88, and suspended from the springs 95 and 96 are rods 98 carrying at their lower ends agate loops 97, in the agates of which rest the knife edges 24 hereinbefore described, as is clearly shown in the drawings.

By turning by means of a screw driver, as above described, the worm 93, the springs 95 and 96, and the agate loop 97, are raised or lowered, carrying with them the member 73 and the rock rod 33, which causes, by means of the rack 75 and gear 76, a small gradual rotation of the cylinders in one direction or the other to adjust the cylinder indication at its initial installation or to enable one to keep the scale at a zero point when nothing is in the platter of the scale throughout its use.

With the thermostatic arrangement above described, it should be observed that there is a little bend to the spring member 83 when the platter of the scale is empty. As the material is placed on the platter the spring 83 bends downwardly, thermostat metal 85 giving less support and proportionally more bend to the spring 83 the colder the weather is, and less bend and more support the warmer the weather becomes. The spring members 95 and 96 are connected together at their lower ends to prevent lateral vibration by means of the rod 100 extending between the arms 98, as clearly shown in Fig. 1, and suspended from the rod 100 is a plunger 101 of a dash pot 102 to prevent vibration in the usual well known manner.

Thus it will be seen with the operating mechanism hereinbefore described, all consisting of one assembly, by merely disconnecting the dash pot connection and unhooking the agate loop 97 from pivots, and by further unhooking the members 85 from 84, one is enabled to take the entire working assembly out of the machine with no effort and with slight possibility of injury to any of the parts. The advantages of such a construction are believed to be apparent. The mechanism can be made in units and tested before being put in the scale housing and these units can be interchangeable. If some part becomes defective or inoperative, or the scale becomes inaccurate, a new unit can be supplied, and the merchant who uses the scale can insert the unit in its place with no danger of injury to the parts, small likelihood of improper connections being made, and the merchant need not require any knowledge of the scale mechanism or of mechanics to follow the simple instructions required to enable one of intelligence to make the connection. It is obvious that these features reduce the factory construction expense considerably and renders the expense of upkeep and maintenance of the scale on behalf of its manufacturer negligible.

In Figs. 5, 6, 7, 8 and 9, I show the locking device employed in accordance with my invention for locking the levers against movement during shipment, or when being carried from place to place. When the scale is in use the device stands as illustrated in Fig. 7. When it is desired to lock the levers a bolt 150 is inserted through the cover 9 through a hole therein provided for that purpose. The bolt to facilitate handling is provided with a suitable handle at one end as illustrated at 151. and is threaded at its opposite end to pass into the threaded hole 152 provided in a bar 153 which is supported through links 154 and pivoted arms 151ᵃ by means of a standard 156 carried by the agate supporting bar 42. The ends of the lever 27 carrying the pivots 26 are provided with lugs 158 adapted to be engaged by the ends of the bar 153 and the pivotally mounted arms 151ª. Thus it will be seen that when bolt 150 is screwed into bar 153 the bar 153 is raised, causing the ends of the bar 153 to fit into the depressions of the lower surface of the lugs 158 of the lever 27, causing the lever 27 to raise, and thereby raising its pivots 26 out of the agate bearings. Further rotation of the bolt 150 causes the ends of the arms 151ª to engage the upper side of the lugs 158, thus securely locking the lever 27 in its raised position and preventing injury to the knife edge pivots 26 during transportation, or the like. Likewise, in shipping, by removing the platter 48, fastened to the platter frame 47, and consequently the hollow posts 46, nothing remains over the base plate 9, and consequently it requires no skill and but little time to condition the scale for shipment or for operation after shipment, and it minimizes the possibility of breakage in shipment, and makes it an exceedingly simple matter to assemble and demonstrate a scale to a prospective purchaser where its simplicity in construction and in assembly becomes of vast importance in a salable device of this nature.

Many modifications and changes in details will readily occur to those skilled in the art without departing from the spirit and scope of my invention as defined in the claims. Therefore what I claim as new and useful and of my own invention and desire to secure by Letters Patent is,—

1. In a weighing device and in combination with the scale operating rod thereof, weight actuated levers controlled by the weight of the material to be weighed for actuating said rod, a check rod, cylindrical scale members controlled by said scale operating rod, said check and scale operating rods being positioned between said cylindrical scale members substantially as shown and described.

2. In a weighing device and in combination with the scale operating rod thereof, weight actuated levers controlled by the weight of the material to be weighed for actuating said rod, a check rod, cylindrical scale members controlled by said scale operating rod, said check and scale operating rods being positioned between said cylindrical scale members, manually controlled means for adjusting the zero reading on said scale independent of said weight actuated levers, and thermostatically controlled means associated with said adjusting means for controlling the readings on said scale.

3. In a weighing device and in combination with the scale operating rod thereof, weight actuated levers controlled by the weight of the material to be weighed for actuating said rod, a check rod, cylindrical scale members controlled by said scale operating rod, said check and scale operating rods being positioned between said cylindrical scale members, manually controlled means for adjusting the zero readings on said scale independent of said weight actuated levers, said adjusting device being anchored under tension to the frame of said weighing device, and said adjustment being secured by the variation in the tension of anchorage, and thermostatic means for maintaining said tension of anchorage constant during heat variations.

4. In a weighing device, and in combination with the scale operating rod thereof weight actuated levers controlled by the weight of the material to be weighed for actuating said rod, a scale member provided with graduations controlled by said rod, and means for controlling said rod independently of the weight actuated levers of said weighing device comprising a spring member clamped to the frame of said weighing device, connections between said spring member and said rod, and thermostatic means for varying the tension of said spring member.

5. In a weighing device, and in combination with the scale operating rod thereof weight actuated levers controlled by the weight of the material to be weighed for actuating said rod, a scale member provided with graduations controlled by said rod, and means for controlling said rod independently of the weight actuated levers of said weighing device, comprising a spring member secured to the frame of said device, connections between said spring member and said rod, and a thermostat clamped to the under surface of said spring member for varying the tension of said spring member in accordance with temperature variations.

6. In a weighing device, and in combination with the scale operating rod thereof weight actuated levers controlled by the weight of the material to be weighed for actuating said rod, a scale member provided with graduations controlled by said rod, and means for controlling said rod independently of the weight actuated levers of said weighing device, comprising a spring member clamped intermediate its ends to the frame of said weighing device, connections between said spring member and said rod, and thermostatic means for varying the tension of said spring member.

7. In a weighing device, and in combination with the scale operating rod thereof actuated by the weight of the material to be weighed, a scale member provided with graduations, and carried at the top of said device extending at right angles to the direction of movement of, and controlled by said rod, levers for actuating said operating rod, and a check rod for said levers and said operating rod positioned at the top of said device, and extending a substantial distance beyond the vertical axis of said operating rod, in a plane substantially parallel to the normal plane of said levers.

8. In a weighing device, and in combination with the scale operating rod thereof actuated by the weight of the material to be weighed, a scale member provided with graduations, and carried at the top of said device extending at right angles to the direction of movement of, and controlled by said rod, levers for actuating said operating rod, and a check rod for said levers and said operating rod positioned in said scale and extending a substantial distance beyond the vertical axis of said operating rod, in a plane substantially parallel to the normal plane of said levers.

9. In a weighing device, and in combination with the scale operating rod thereof actuated by the weight of the material to be weighed, a scale member provided with graduations, and carried at the top of said device extending at right angles to the direction of movement of, and controlled by said rod, levers for actuating said operating rod, and a check rod for said levers and said operating rod positioned at the top of said device, and a support for said check rod formed on the rear of the frame of said weighing device and extending a substantial distance forwardly beyond the front surface thereof.

10. In a weighing mechanism, and in combination with a scale member provided with graduations, and means for moving said scale member by and in accordance with the weight imposed upon said mechanism including a platter to receive the material to be weighed, a platter rest therefor, and a lever operatively connected to said scale member, and positioned between said platter and said platter rest, a direct connection between said lever and said scale member, and means for rocking said lever through said platter rest by and in accordance with the weight placed on said platter.

11. In a weighing mechanism, and in combination with a scale member provided with graduations, and means for moving said scale member by and in accordance with the weight imposed upon said mechanism including a platter to receive the material to be weighed, a platter rest therefor, said platter being removable from said platter rest, and a lever operatively connected by direct connection to said scale member and positioned between said platter and said platter rest, pivots carried by said lever, and pivot fulcra therefor carried by said platter rest whereby said lever may be readily removed from said platter rest.

12. In a weighing mechanism, and in combination with a scale member provided with graduations, and means for moving said scale member by and in accordance with the weight imposed upon said mechanism including a platter to receive the material to be weighed, having downwardly extending hollow posts, a platter rest having upwardly extending pins to engage in said hollow posts, and a lever operatively connected to said scale member and positioned between said platter and said platter rest, and means for rocking said lever through said platter rest by and in accordance with the weight placed on said platter.

13. In a weighing mechanism, and in combination with a scale member provided with graduations, and means for moving said scale member by and in accordance with the weight imposed upon said mechanism including a platter to receive the material to be weighed, having downwardly extending hollow posts, a platter rest having upwardly extending pins to engage in said hollow posts, said platter being removable from said platter rest, and a lever operatively connected to said scale member and positioned between said platter and said platter rest, pivots carried by said lever, and pivot fulcra therefor carried by said platter rest whereby said lever may be readily removed from said platter rest.

14. In a weighing device, a base, a vertically extending frame supported thereby, a rotatable scale member mounted at the top of said frame, a platter rest located in said base, and provided with a plurality of fulcra, a platter to receive the material to be weighed, positioned above said base, and detachably supported by said platter rest, a movable upright member secured to the end of said platter rest and extending vertically in said frame to a point above the top thereof, a lever weighted at its free end, positioned between said platter and said platter rest, and provided with a plurality of pivot points to detachably engage the fulcra of said platter rest, and also provided at its free end with a tension pivot, a movable rod for actuating said scale member and connected at its lower end to the unweighted end of said lever, a pair of tension springs removably anchored at one end to approximate top of said frame, and supporting at their lower end fulcra for said tension pivots of said lever, substantially as and for the purpose described.

15. In a weighing device, a reading adjusting device comprising a bell crank lever provided with a pivot point adapted to float in a vertical plane, means for detachably anchoring one end of said lever, an arm pivotally mounted at a point between its ends to one end of said bell crank lever and pivotally secured at another portion thereof to the other end of said bell crank lever, and spaced tension springs supported by the said arm.

16. In a weighing device, a reading adjusting device, comprising a bell crank lever provided with a pivot point adapted to float in a vertical plane, means for detachably anchoring one end of said lever, an arm pivotally mounted at a point between its ends to one end of said bell crank lever and pivotally secured at one end to the other end of said bell crank lever, spaced tension springs supported by said arm, and means for controlling and adjusting the pivot point of said bell crank lever.

17. In a weighing device, a reading adjusting device comprising a bell crank lever provided with a pivot point adapted to float in a vertical plane, means for detachably securing one end of said lever, an arm pivotally mounted at a point between its ends to one end of said bell crank lever and pivotally secured at one end to the other end of said bell crank lever, tension springs supported by said arm, and an adjustable connection between said arm and said lever to control and fix the position of the pivot point thereof.

18. In a weighing device, a base frame, a lever and a base member located therein, fulcra carried by said base member, pivots carried by said lever, and adapted to be positioned in said fulcra, and removable means adapted to be inserted through said base frame for raising said pivots out of said fulcra, and locking said lever against movement relative to said base frame.

19. In a weighing device, a base frame, a lever and a base member located therein, fulcra carried by said base member, pivots carried by said lever, and adapted to be positioned in said fulcra, vertical posts carried by said base member, locking arms pivotally mounted intermediate their ends on said posts, a plate slidably mounted on said posts and pivotally secured to one end of each of said arms, and means for raising said plate, whereby said plate raises said lever pivots out of said fulcra, and said arms lock said lever against movement.

20. In a weighing device, a base frame, a lever and a base member located therein, fulcra carried by said base member, pivots carried by said lever, and adapted to be positioned in said fulcra, vertical posts carried by said base member, locking arms pivotally mounted intermediate their ends on said posts, a plate slidably mounted on said posts and pivotally secured to one end of each of said arms, said plate provided with a threaded hole therein, and a bolt adapted to be inserted through the top of said base frame and screwed into the threaded hole of said plate to raise said plate to cause the same to lift the lever pivots out of their fulcra and rock said arms to lock said lever between said arms and said plate to prevent movement thereof relative to said base frame.

21. In a weighing device, and in combination with the operating rod thereof, weight actuated levers controlled by the weight of the material to be weighed for actuating said rod, a scale member provided with graduations and controlled by said rod, and a combined zero reading adjusting and thermostatically controlled means for controlling said rod.

22. In a weighing device, and in combination with the operating rod thereof, weight actuated levers controlled by the weight of the material to be weighed for actuating said rod, a scale member provided with graduations and controlled by said rod, and a combined zero reading adjusting and thermostatically controlled means for controlling said rod throughout all positions of said rod with respect to said scale member.

23. In a weighing device, and in combination with the operating rod thereof, a weight actuated lever system controlled by the weight of the material to be weighed for actuating said rod, a combined manual adjustable and thermostat device included in said system said thermostat device participating in and thermostatically controlling the movement of said rod throughout its movements as actuated by the material being weighed.

In testimony whereof I have hereunto set my hand on this second day of December, A. D. 1919.

LEONARD T. JOHNSON.

ing disc forming part of said member, a reciprocating roll carried by said member, means adjustably carried by said disc for engaging and moving the roll in the direction of travel of said can carrying member, and means for releasing said roll.

25. In a cover conveyor for can machines, the combination with a pair of laterally adjustable side rails, of a central rail, a discharge member pivotally connected to one of said side rails, and means for adjusting said latter named side rail longitudinally.

26. In a can seaming machine, the combination of a rotary carrier, can supporting members rotatably mounted on said carrier, a can seaming device adapted to move with said carrier through a part of the rotation of said carrier and to be pressed into operative relation to said cans for seaming the same, and means for returning said seaming device to its initial position to move the same into engagement with the next can.

27. In a container closing machine, the combination of a continuously moving carrier for containers, a single set of closing devices each of which is adapted to perform a different part of the closing operation and which operate substantially simultaneously on different containers, and means for moving said closing devices into operative relation to different containers while the containers are moving continuously through the machine.

28. In a can seaming machine, the combination of a carrier for the cans, a seaming device, means for moving said seaming device with a can to effect the seaming of the can and in a direction other than the direction of movement of said can to place the seaming device into operative relation to another can, and a fixed cam which causes the actuation of said seaming device to effect the seaming of the cans.

29. In a can seaming machine, the combination of a carrier for moving the cans continuously through the machine, a member movable with said carrier during a portion of the movement thereof and movable relatively to the carrier during another portion of the movement of said member, seaming devices on said member which effect the seaming of said cans while moving with said carrier, and a stationary cam which causes the seaming devices to move toward and from said cans.

30. In a container closing machine, the combination of a rotary carrier for the containers, a closing device, means for imparting an oscillatory movement to said closing device during a part of which movement said closing device moves on the arc of a circle with a container to effect the closing thereof and during another part of which movement said closing device moves into operative relation to another container, and a stationary cam engaged by said closing device and which moves said device into operative relation to a container.

In testimony whereof, I have hereunto set my hand and affixed my seal.

CHESLEY T. SMALL. [L. s.]